US009748016B2

(12) United States Patent
Shigeta et al.

(10) Patent No.: US 9,748,016 B2
(45) Date of Patent: Aug. 29, 2017

(54) PROCESS FOR PRODUCING CARBON NANOTUBE COMPOSITION AND CARBON NANOTUBE COMPOSITION

(71) Applicant: ZEON CORPORATION, Tokyo (JP)

(72) Inventors: Masahiro Shigeta, Tsukuba (JP); Tsutomu Nagamune, Tsukuba (JP); The Ban Hoang, Tsukuba (JP); Mitsugu Uejima, Tsukuba (JP)

( * ) Notice: Subject to any disclaimer, the term of this patent is extended or adjusted under 35 U.S.C. 154(b) by 125 days.

(21) Appl. No.: 14/360,746

(22) PCT Filed: Oct. 26, 2012

(86) PCT No.: PCT/JP2012/080451
§ 371 (c)(1),
(2) Date: May 27, 2014

(87) PCT Pub. No.: WO2013/080912
PCT Pub. Date: Jun. 6, 2013

(65) Prior Publication Data
US 2014/0353556 A1 Dec. 4, 2014

(30) Foreign Application Priority Data

Nov. 28, 2011 (JP) ................................. 2011-259257
Jun. 21, 2012 (JP) ................................. 2012-140152

(51) Int. Cl.
H01B 1/24 (2006.01)
C01B 31/00 (2006.01)
B82Y 30/00 (2011.01)
C01B 31/02 (2006.01)
B82Y 40/00 (2011.01)
C08J 3/215 (2006.01)
C08K 7/24 (2006.01)

(52) U.S. Cl.
CPC ............... H01B 1/24 (2013.01); B82Y 30/00 (2013.01); B82Y 40/00 (2013.01); C01B 31/0233 (2013.01); C01B 31/0273 (2013.01); C08J 3/215 (2013.01); C08K 7/24 (2013.01); C01B 2202/32 (2013.01); C08J 2309/04 (2013.01); C08K 2201/006 (2013.01); C08K 2201/011 (2013.01)

(58) Field of Classification Search
CPC .......... B82Y 40/00; B82Y 30/00; H01B 1/04; H01B 31/04; H01B 1/24; C01B 2202/36; C01B 31/0273; C01B 2202/32; C01B 31/0233
USPC ................... 252/500–511; 423/445 R, 445 B
See application file for complete search history.

(56) References Cited

U.S. PATENT DOCUMENTS 5,179,171 A 1/1993 Minami et al.
5,202,388 A 4/1993 Iio et al.
2006/0211807 A1 9/2006 Koning et al.
2008/0318049 A1 12/2008 Hata et al.
2009/0297846 A1 12/2009 Hata et al.
2010/0301278 A1* 12/2010 Hirai ...................... B82Y 30/00 252/502
2012/0122020 A1* 5/2012 Hata ....................... B82Y 30/00 429/532
2012/0321544 A1* 12/2012 Takai ...................... B01J 23/745 423/447.3
2013/0004657 A1* 1/2013 Xu .......................... B82Y 30/00 427/122
2013/0261246 A1 10/2013 Ong et al.
2015/0329693 A1* 11/2015 Shigeta .................... C08K 3/04 524/566

FOREIGN PATENT DOCUMENTS

| CN | 101913591 A | 12/2010 |
|---|---|---|
| EP | 1 026 189 A1 | 8/2000 |
| EP | 1 787 955 A1 | 5/2007 |
| EP | 2 138 535 A1 | 12/2009 |
| JP | A-5-97978 | 4/1993 |
| JP | A-5-310845 | 11/1993 |
| JP | A-11-124429 | 5/1999 |
| JP | A-2004-210830 | 7/2004 |
| JP | A-2006-517996 | 8/2006 |
| JP | A-2009-196840 | 9/2009 |
| JP | A-2010-1475 | 1/2010 |
| JP | A-2010-185032 | 8/2010 |
| JP | A-2010-235320 | 10/2010 |
| JP | B2-4621896 | 1/2011 |
| JP | B2-4811712 | 11/2011 |

OTHER PUBLICATIONS

Xia ("Polymer/Carbon Nanotube Composite Emulsion Prepared Through Ultrasonically Assisted In Situ Emulsion Polymerization." J Appl Pol Sc, 100, pp. 3123-3130, 2006).*
Caneba ("Novel Ultrasonic Dispersion of Carbon Nanotubes." Journal of Minerals & Materials Characterization & Engineering, vol. 9, No. 3, pp. 165-181, 2010).*
Inoue ("Synthesis of diameter-controlled carbon nanotubes using centrifugally classified nanoparticle catalysts." Carbon 45, pp. 2164-2170, 2007).*
Hata, K. et al., "Water-Assisted Highly Efficient Synthesis of Impurity-Free Single-Walled Carbon Nanotubes," Science, Nov. 19, 2004, pp. 1362-1364, vol. 306.
Brandup, J. et al., Polymer Handbook, 3$^{rd}$ Edition, pp. VII/526-VII/533.
International Search Report issued in International Application No. PCT/JP2012/080451 on Jan. 22, 2013 (with translation).

(Continued)

Primary Examiner — Tri V Nguyen

(57) ABSTRACT

A method of the present invention for producing a carbon nanotube includes: a dispersing step of dispersing a carbon nanotube in a solvent by carrying out a dispersion treatment that brings about a cavitation effect, the carbon nanotube having an average diameter (Av) and a diameter distribution ($3\sigma$) that satisfy $0.60 > 3\sigma/Av > 0.20$; and a mixing step of mixing carbon nanotube slurry obtained in the dispersing step with latex.

10 Claims, No Drawings

(56) References Cited

OTHER PUBLICATIONS

International Preliminary Report on Patentability issued in International Application No. PCT/JP2012/080451 on Jun. 3, 2014 (with translation).
Yu, J. et al., "Characterization of conductive multiwall carbon nanotube/polystyrene composites prepared by latex technology," Carbon, Oct. 2007, pp. 2897-2903, vol. 45, No. 15.
Wang, J.D., et al., "Preparation and Mechanical Properties of Natural Rubber Powder Modified by Carbon Nanotubes," Journal of Applied Polymer Science, Jun. 2006, pp. 4697-4702, vol. 100, No. 6.
Jul. 22, 2015 extended Search Report issued in European Patent Application No. 12852928.6.

* cited by examiner

PROCESS FOR PRODUCING CARBON NANOTUBE COMPOSITION AND CARBON NANOTUBE COMPOSITION

TECHNICAL FIELD

The present invention relates to a method of producing a carbon nanotube composition and to the carbon nanotube composition.

BACKGROUND ART

Conventionally, proposals have been made for a composite material having desired electrical conductivity by blending a carbon material such as carbon black into a resin. In recent years, along with the advancement of device performance, there have been demands for further enhancement of the functionality of materials. In view of the circumstances, attempts have been made to blend, as a material having excellent electrical conductivity and contributing to excellent machine characteristics, a carbon nanotube instead of conventional carbon materials.

It is known that vulcanizing a composition, which is obtained by blending a cross-linker and a carbon nanotube with a hydrogenated carboxylated nitrile rubber having heat resistance, ozone resistance, chemical resistance, and oil resistance, allows an increase in tension strength and elasticity modulus of the nitrile rubber while maintaining elongation at breakage and distortion characteristics (see Patent Literature 1).

In addition, Patent Literature 1 discloses, as a rubber material for tires, an elastomer composition in which 0.1 to 150 parts by weight of carbon nanotube is blended with 100 parts by weight of an elastomer. The elastomer composition is obtained by mixing carbon nanotube slurry with an elastomer solution or with latex, and then coagulating the mixture. Patent Literature 1 teaches that the carbon nanotube slurry is obtained by (i) mixing a carbon nanotube with water or a solvent in combination with an emulsifier and/or a dispersant as needed and then (ii) homogenizing the mixture with the use of a stirrer. Patent Literature 2 notes that a short carbon nanotube having a length of 100 nm or less is preferable in light of its dispersibility.

Patent Literature 3 discloses a formed product obtained by (i) dispersing a single-walled carbon nanotube into water in the presence of gum arabic or SDS, thereby obtaining a dispersion liquid, (ii) mixing the dispersion liquid with polystyrene-based latex or polyethylene-based latex, thereby obtaining a mixture, (iii) freeze-drying the mixture so as to obtain a composition, and then (iv) heat forming the composition.

Meanwhile, a proposal has recently been made for a method that significantly increases activity and lifetime of a catalyst by, in employing the CVD method, causing a catalyst activation material such as water, along with material gas, to come into contact with the catalyst (this method will be hereinafter referred to as "super-growth method"; see Non-Patent Literature 1).

CITATION LIST

Patent Literatures

Patent Literature 1
Japanese Patent Application Publication, Tokukai, No. 2010-001475 A (European Patent Application Publication No. 23138535)

Patent Literature 2
Japanese Patent Application Publication, Tokukai, No. 2004-210830 A Patent Literature 3
Japanese Patent Application Publication, Tokukai, No. 2006-517996 A (US Patent Application Publication No. 2006-211807)

Non-Patent Literature

Non-Patent Literature 1
Kenji Hata et al, Water-Assisted Highly Efficient Synthesis of Impurity-Free Single-Walled Carbon Nanotubes, SCIENCE, 2004.11.19, Vol. 30 6, p. 1362-1364

SUMMARY OF INVENTION

Technical Problem

A single-walled carbon nanotube obtained by the super-growth method has a high aspect ratio, and is therefore promising as an electrically conductive filler intended for a composite material. However, due to its length, the single-walled carbon nanotube poses a problem of poor dispersibility when compounded with other materials (see Patent Literature 2). Furthermore, the single-walled carbon nanotube poses such a problem that in a case where the carbon nanotube is to be dispersed by applying high shear force with a device such as a twin-screwed kneading device so as to produce a composite material of the carbon nanotube and rubber, the carbon nanotube becomes broken apart and therefore desired characteristics cannot be obtained.

An object of the present invention is to provide a carbon nanotube composition having higher electrical conductivity.

Solution to Problem

In order to attain the object, a method of the present invention for producing a carbon nanotube composition includes: a dispersing step of dispersing a carbon nanotube in a solvent by carrying out a dispersion treatment that brings about a cavitation effect, the carbon nanotube having an average diameter (Av) and a diameter distribution ($3\sigma$) that satisfy $0.60 > 3\sigma/Av > 0.20$; and a mixing step of mixing, with latex, carbon nanotube slurry obtained in the dispersing step.

Advantageous Effects of Invention

The present invention provides a carbon nanotube composition having higher electrical conductivity.

DESCRIPTION OF EMBODIMENTS

Method of Producing Carbon Nanotube Composition

A method of the present invention for producing a carbon nanotube composition (hereinafter referred to as "production method of the present invention") includes: a dispersing step of dispersing a carbon nanotube in a solvent by carrying out a dispersion treatment that brings about a cavitation effect, the carbon nanotube having an average diameter (Av) and a diameter distribution ($3\sigma$) that satisfy $0.60 > 3\sigma/Av > 0.20$; and a mixing step of mixing, with latex, carbon nanotube slurry obtained in the dispersing step.

[Dispersing Step]

In the dispersing step, the carbon nanotube, which has an average diameter (Av) and a diameter distribution (3σ) that satisfy 0.60>3σ/Av>0.20, is dispersed in a solvent by a dispersion treatment which brings about a cavitation effect. This results in carbon nanotube slurry.

(Carbon Nanotube)

The carbon nanotube of the present invention has an average diameter (Av) and a diameter distribution (3σ) that satisfy 0.60>3σ/Av>0.20. The average diameter (Av) herein indicates an average value of diameters of 100 carbon nanotubes measured by use of a transmission electron microscope. The diameter distribution (3σ) herein indicates a value obtained by multiplying a standard deviation (σ) based on the diameters of 100 carbon nanotubes by 3. Note that the standard deviation in the present specification is a sample standard deviation.

By using a carbon nanotube having an average diameter (Av) and a diameter distribution (3σ) that satisfy 0.60>3σ/Av>0.20, it is possible to obtain a composition that shows excellent electrical conductivity even if an amount of the carbon nanotube is small. From the perspective of properties of the composition to be obtained, it is more preferable that 0.60>3σ/Av>0.25 is satisfied, and it is even more preferable that 0.60>3σ/Av>0.50 is satisfied.

"3σ/Av" corresponds to a diameter distribution of a carbon nanotube. A large 3σ/Av means that the diameter distribution is large. According to the present invention, the diameter distribution is preferably a normal distribution. The diameter distribution discussed herein is obtained by (i) measuring diameters of 100 randomly selected carbon nanotubes which are observable with the use of a transmission electron microscope, (ii) plotting the measured data on a graph whose horizontal axis indicates a diameter and whose vertical axis indicates a frequency, and (iii) approximating the plotted data by use of the Gaussian distribution. Although the value of 3σ/Av can be made large by combining a plurality of types of carbon nanotubes that were obtained by use of differing production methods, it is difficult in such a case to obtain a normally-distributed diameter distribution. That is, according to the present invention, it is preferable to use (a) a single type of carbon nanotubes or (b) a blend of a single type of carbon nanotubes and other types of carbon nanotubes which have no influence on a diameter distribution of the single type of carbon nanotubes.

From the perspective of high electrical conductivity, an average diameter of carbon nanotubes is preferably 0.5 nm or more and 15 nm or less, and more preferably 1 nm or more and 10 nm or less.

The carbon nanotube of the present invention can be used without any limitation, provided that the carbon nanotube satisfies such conditions as 0.60>3σ/Av>0.20. However, it is preferable to use a carbon nanotube obtained by use of the super-growth method disclosed in Japanese Patent No. 4,621,896 B (European Patent No. 1787955) and in Japanese Patent No. 4,811,712 B (US Patent Application Publication, No. 2009-297846) (such a carbon nanotube is hereinafter referred to as "SGCNT"), and it is more preferable to use, of all the carbon nanotubes obtained by use of the super-growth method, a carbon nanotube having a BET specific surface area of 600 m²/g or more because such a carbon nanotube is highly effective in modifying a composition.

The carbon nanotube of the present invention is preferably a carbon nanotube having a Radial Breathing Mode (RBM) peak in Raman spectroscopy. Note that there is no RBM in the Raman spectra of a carbon nanotube made up of three or more layers.

The carbon nanotube of the present invention is also preferably a carbon nanotube having (i) a G/D ratio of 1 or more and 20 or less and (ii) a structural length of 100 μm or more and 5000 μm or less when synthesized. Such a carbon nanotube can be obtained by use of, for example, the super-growth method described above.

The carbon nanotube produced by the super-growth method has a G/D ratio of 1 or more and 20 or less. This is based on a range of results obtained by measuring G/D ratios of actually produced carbon nanotubes.

In a case where the carbon nanotube having a structural length of 100 μm or more and 5000 μm or less when synthesized is used, an elastomer composition to be obtained as a result demonstrates more excellent electrical conductivity.

By using a carbon nanotube having a G/D ratio of 1 or more and 20 or less and having (when synthesized) a structural length of 100 μm or more and 5000 μm or less, it is thus possible to obtain excellent electrical conductivity even if an amount of the carbon nanotube is small.

The carbon nanotube preferably has a specific surface area of 600 m²/g or more. For carbon nanotubes, a majority of which are unopened carbon nanotubes, the specific surface area is preferably 600 m²/g or more. For carbon nanotubes, a majority of which are opened carbon nanotubes, the specific surface area is 1300 m²/g or more. Such carbon nanotubes are highly modification-effective.

The weight density of the carbon nanotube is preferably 0.002 g/cm³ to 0.2 g/cm³. In a case where the weight density is 0.2 g/cm³ or less, bonding of carbon nanotubes by which the carbon nanotube is constituted becomes weak. This makes it easy to evenly disperse the carbon nanotubes when the carbon nanotube is stirred in a solvent or the like. In other words, the weight density to be 0.2 g/cm³ or less makes it easy to obtain a homogeneous dispersion liquid. In addition, in a case where the weight density is 0.002 g/cm³ or more, integrity of the carbon nanotube can be increased and the carbon nanotubes can be prevented from coming apart. This allows handling of the carbon nanotube to be easy.

(Solvent)

Specific examples of the solvent encompass, but not particularly limited to: an aliphatic hydrocarbon-based solvent, an aromatic hydrocarbon-based solvent, an ether-based solvent, an alcohol-based solvent, an ester-based solvent, a ketone-based solvent, a mixed solvent of these, and water. From the perspective of easy handling and environmental safety, water is preferable.

As needed, the solvent can contain a dispersant. An appropriate dispersant is not limited to any particular one, provided that the dispersant can aid the dispersion of the carbon nanotube. The dispersant is preferably a surfactant or polysaccharides, more preferably the surfactant, and even more preferably an anionic surfactant. This is because the anionic surfactant brings about an excellent balance of (i) dispersibility of the carbon nanotube, (ii) coagulability, and (iii) physical properties of a composition.

Examples of the surfactant and the polysaccharides are as follows:

Examples of the surfactant encompass: sulfosuccinate-based anionic surfactants (Commercial Product Examples: LIPAL (Registered Trademark; the same is true of the following) 8351, LIPAL 860K, LIPAL 870P, LIPAL MSC, LIPAL MSE, and LIPAL NTD manufactured by Lion Corporation, and PELEX (Registered Trademark; the same is true of the following) TR, PELEX TA, and PELEX OT-P manufactured by Kao Chemicals); alkyl ether sulfonic acid sodium salt-based anionic surfactants (Commercial Product Examples: PELEX SS-L and PELEX SS-H manufactured by Kao Chemicals); alkyl benzene sulfonic acid sodium salts (Commercial Product Examples: Libon LS-250, Libon PS-230, Libon PS260, Libon PS860, LN2050D, LN2450, and BN2060 manufactured by Lion Corporation); sodium lauryl sulfates (Commercial Product Examples: EMAL (Registered Trademark; the same is true of the following) 10G, EMAL 10PT, EMAL 2F-30, EMAL 2FG, EMAL 2F Paste, EMAL O, and EMAL OS manufactured by Kao Chemicals; Note that these are also sold as sodium dodecyl sulfates or SODIUM LAURYL SULFATES); sodium alkylbenzene sulfonates (Commercial Product Examples: NEOPELEX (Registered Trademark; the same is true of the following) G-15, NEOPELEX G-25, and NEOPELEX G-65 manufactured by Kao Chemicals; Note that these are also sold as sodium alkylbenzene sulfonates); sodium 1-hexadecanesulfonate; sodium 1-octadecanesulfonate; sodium 1-pentadecanesulfonate; sodium 1-tetradecanesulfonate; sodium 1-tridecanesulfonate; lauryl alcohol ethoxylates (Commercial Product Examples: Adekatol (Registered Trademark; the same is true of the following) LA675B, Adekatol LA775, Adekatol 875, Adekatol LA975, and Adekatol LA1275 manufactured by ADEKA Corporation); secondary alcohol ethoxylates (Commercial Product Examples: Adekatol SO-105, Adekatol SO120, Adekatol SO135, and Adekatol SO145 manufactured by ADEKA Corporation); and special phenol ethoxylates (Commercial Product Examples: Adekatol SP-12, Adekatol PC-1, Adekatol PC-6, and Adekatol PC-10 manufactured by ADEKA Corporation).

Examples of the polysaccharides encompass: gum arabic; carboxymethylcellulose sodium salts; carboxymethylcellulose ammonium salts, and hydroxyethyl cellulose.

Note that dispersant concentration in the solvent only need to be critical micelle concentration or more. The amount of carbon nanotube to be dispersed into the solvent with respect to 100 parts by weight of the whole amount of solvent containing the dispersant is preferably 0.01 part by weight or more and 1 part by weight or less.

(Dispersion Treatment)

A method of carrying out a dispersion treatment only needs to be able to obtain cavitation effect. The dispersion treatment method, which can obtain the cavitation effect, utilizes a shock wave generated by the implosion of vacuum bubbles when high energy is applied to a liquid. The use of the dispersion treatment method allows the carbon nanotube to be dispersed into water without compromising characteristics of the carbon nanotube.

Specific examples of the dispersion treatment, by which the cavitation effect can be obtained, encompass a dispersion treatment by use of ultrasonic waves, a dispersion treatment by use of a jet mill, and a dispersion treatment by use of high-shear stirring. It is possible to employ only one of these dispersion treatments or to employ these dispersion treatments in combination. To be more specific, an ultrasonic wave homogenizer, a jet mill, and a high-shear stirring device, for example, are suitable. It is only necessary to use well-known types of these devices.

If other dispersion treatments are used such as that by use of a ball mill, the carbon nanotube does not become evenly dispersed into a composition. This supposedly causes electrical properties to deteriorate.

In a case where an ultrasonic wave homogenizer is used for dispersion of the carbon nanotube, it is only necessary to add the carbon nanotube to a solvent, and then to irradiate the solvent with an ultrasonic wave with the use of the ultrasonic wave homogenizer. A length of time for the irradiation only needs to be set according to an amount of carbon nanotube, a type of dispersant, and the like, and is preferably 3 minutes or more and more preferably 30 minutes or more, and is preferably 5 hours or less and more preferably 2 hours or less, for example. Furthermore, an output is preferably 100 W or more and 500 W or less, and a temperature is preferably 15° C. or more and 50° C. or less, for example.

In a case where a jet mill is used, it is only necessary to add the carbon nanotube to a solvent, and then process the solvent with the use of the jet mill. The number of times to process the solvent only needs to be set according to an amount of carbon nanotube, a type of dispersant, and the like, and is preferably 2 times or more and more preferably 5 times or more, and is preferably 100 times or less and more preferably 50 times or less, for example. Furthermore, pressure is preferably 20 MPa to 250 MPa, and a temperature is preferably 15° C. to 50° C., for example. In the case where a jet mill is used, a synthetic surfactant is preferably added as a dispersant to the solvent. Advantages of synthetic surfactants over polysaccharides are as follows: Since a polysaccharide solution is viscous, pressure to the jet mill easily increases. This subjects the jet mill to stress, and may therefore cause it to malfunction. With the use of a synthetic surfactant, a jet mill can stably operate.

An example of such a jet mill is a high-pressure wet jet mill. Specifically, examples encompass "Nanomaker" (manufactured by Advanced Nano Technology Co., Ltd.), "Nanomizer" (manufactured by NANOMIZER Inc.), "Nanomizer" (manufactured by Yoshida Kikai Co. Ltd.), and "Nano Jet Pal (Registered Trademark)" (manufactured by JOKOH CO., LTD.).

In a case where a high-shear stirring device is used for the dispersion of the carbon nanotube, it is only necessary to add the carbon nanotube to a solvent, and process the solvent with the use of the high-shear stirring device. A faster evolution speed is more preferable. Furthermore, the duration of operation (period of time in which a machine is spinning) is preferably 3 minutes or more and 4 hours or less, a peripheral velocity is preferably 5 m/s or more and 50 m/s or less, and a temperature is preferably 15° C. or more and 50° C. or less. In the case where the high-shear stirring device is used, polysaccharides are more preferable as a dispersant. A polysaccharide solution is highly viscous and therefore high shearing stress can be easily applied. This causes the dispersion of the carbon nanotube to be promoted.

Examples of such a high-shear stirring device encompass: stirrers typified by "Ebara Milder" (manufactured by EBARA CORPORATION), "CAVITRON" (manufactured by EUROTEC Co., Ltd.), and "DRS2000" (manufactured by IKA WORKS, Inc.); stirrers typified by "CLEARMIX (Registered Trademark) CLM-0.8S" (manufactured by M Technique Co., Ltd.); turbine-type stirrers typified by "T. K. Homo Mixer" (manufactured by Tokushu Kika Kogyo Co., Ltd.); and stirrers typified by "TK Fillmix" (manufactured by Tokushu Kika Kogyo Co., Ltd.).

Regardless of what device to be used to carry out the dispersing step, a dispersion status of the carbon nanotube can be inspected by (i) inspecting an aggregate by visual observation or by use of an optical microscope, (ii) measuring centrifugal separation and absorbing spectra in combination, or (iii) the other appropriate analysis. In a case where the carbon nanotube is dispersed a little or not dispersed at all, the carbon nanotube is removed from a liquid by centrifugal separation with a force of 100 G to 10000 G. On the other hand, in a case where the carbon nanotube is highly dispersed, the carbon nanotube is not removed, so that the liquid retains its black color.

The dispersing step is preferably carried out at a temperature of 50° C. or less. This is because, in such a case, a change in concentration due to the vaporization of the solvent can be suppressed. In a case where a non-ionic surfactant in particular is used as a dispersant, the dispersing step is to be carried out at (i) a temperature at which the dispersant does not freeze or (ii) a temperature that does not fall lower than a clouding point of the non-ionic surfactant. This allows the dispersant to function well.

There are no particular limitations on a dispersion state, provided that the aforementioned device is used to disperse the carbon nanotube. However, the dispersion state is preferably a state in which (i) no aggregate is observable by visual observation, (ii) the carbon nanotube is evenly dispersed, and (iii) the G/D ratio as compared with a G/D ratio before the initiation of the dispersion treatment is decreased by a smaller amount.

[Mixing Step]

In the mixing step, a carbon nanotube slurry obtained by the dispersing step only needs to be mixed with latex.

(Latex)

Examples of suitable latex encompass (i) latex made of a resin which is a macromolecular material and (ii) latex made of an elastomer.

Examples of the resin encompass styrene resin, acrylic resin, methacrylic resin, organic acid vinyl ester resin, vinyl ether resin, halogen-containing resin, olefin resin, alicyclic olefin resin, polycarbonate resin, polyester resin, polyamide resin, thermoplastic polyurethane resin, polysulfone resin (e.g. polyether sulfone, polysulfone, and the like), polyphenylene ether resin (e.g. polymer of 2,6-xylenol and the like), cellulose derivative (e.g. cellulose esters, cellulose carbamates, cellulose ethers, and the like), and silicon resin (e.g. polydimethylsiloxane, polymethylphenylsiloxane, and the like). Examples of the alicyclic olefin resin encompass (i) a cyclic olefin random copolymer disclosed in the Japanese Patent Application Publication, Tokukaihei, No. 05-310845 A (1993) and in the U.S. Pat. No. 5,179,171, (ii) a hydrogenated polymer disclosed in the Japanese Patent Application Publication, Tokukaihei, No. 05-97978 A (1993) and in the U.S. Pat. No. 5,202,388, and (iii) a thermoplastic dicyclopentadiene ring-opening polymer and its hydrogen additive which are disclosed in the Japanese Patent Application Publication, Tokukaihei, No. 11-124429 A (1999) (European Patent No. 1026189).

Examples of the elastomer encompass acrylic nitrile-butadiene rubber (NBR), acrylic nitrile-isoprene rubber, acrylic nitrile-butadiene-isoprene rubber, styrene-butadiene rubber (SBR), butadiene rubber (BR), isoprene rubber (IR), natural rubber (NR), ethylene-propylene-diene rubber (EPDM), butyl rubber (IIR), and rubber having an unsaturated double bond (such as a partially hydrogenated additive of these elastomers). Examples of the partial hydrogen additive encompass hydrogenated NBR and hydrogenated SBR. It is possible to use (i) each of these rubbers independently or (ii) two or more of these rubbers in combination.

Examples of a method for obtaining latex for use in the production method of the present invention encompass (1) a method in which latex is obtained by emulsifying, in the presence of a surfactant, a resin dissolved in an organic solvent or an elastomer solution, and, as needed, removing the organic solvent and (2) a method in which latex is directly obtained by carrying out emulsion polymerization or suspension polymerization of monomers by which a resin or an elastomer is constituted.

In a case where the latex is to be obtained by use of the method (1), it is preferable to use a resin and an elastomer each of which is dissolvable in an organic solvent having a solubility parameter of 10 $(cal/cm^3)^{1/2}$ or less. This is because, in such a case, a composition can be obtained with high yield. The solubility parameter is (i) defined as a square root of cohesive energy density and (ii) a parameter proposed by Hildebrand and Scott, based on a regular solution in which an entropy change is approximately 0 and an enthalpy change occurs. Representative solvent solubility parameters are illustrated in "Polymer Handbook" (Third Edition).

Examples of the organic solvent having a solubility parameter of 10 $(cal/cm^3)^{1/2}$ or less encompass: aliphatic solvents such as butane, pentane, hexane, heptane, octane, cyclopentane, cyclohexane, decane, and dodecane; aromatic solvents such as toluene, propyl benzene, and benzonitrile; halogen solvents such as butyl chloride, amyl chloride, allyl chloride, and chlorotoluene; ketone-based solvents such as acetone, methyl ethyl ketone, diethyl ketone, di-isopropyl ketone, methyl isobutyl ketone, methyl hexyl ketone, diisobutyl ketone, butylaldehyde, propyl acetate, butyl acetate, and amyl acetate; ester-based solvents such as ethyl propionate, ethyl isobutyrate, and butyl butyrate; and ether-based solvents such as dimethyl ether, dihexyl ether, ethylene glycol dimethyl ether, and ethylene glycol diethyl ether.

The latex for use in the production method of the present invention is preferably an elastomer-dispersed liquid, and is more preferably nitrile rubber that is an elastomer having a nitrile structure or an aromatic ring structure. In a case where an elastomer having a nitrile structure or an aromatic ring structure is used, an effect of modifying a composition to be obtained is high. This allows for high electrical conductivity even if an amount of carbon nanotube to be added is small.

The elastomer having a nitrile structure is a polymer or its hydride having a structural unit derived from an $\alpha,\beta$-unsaturated nitrile and a structural unit derived from a conjugate diene. From the perspective of physical properties of the composition, a nitrile structure content of the elastomer is preferably 20 weight % or more, more preferably 25 weight % or more and 55 weight % or less, and even more preferably 25 weight % or more and 50 weight % or less. Note that the nitrile structure content is a ratio of a weight of an $\alpha,\beta$-unsaturated nitrile-derived structural unit to a weight of the entire rubber. The nitrile structure content is obtained by, in accordance with the mill oven method of JIS K 6364, (i) measuring the amount of nitrogen generated, (ii) reducing a bonding amount based on an acrylonitrile molecular weight, and then (iii) taking a median of a value thus determined.

Examples of the $\alpha,\beta$-unsaturated nitrile encompass an acrylic nitrile and a methacrylonitrile. Examples of the conjugate diene encompass C4-C6 conjugate dienes such as 1,3-butadiene, isoprene, and 2,3-methylbutadiene.

Copolymerization of the $\alpha,\beta$-unsaturated nitrile and the conjugate diene can be attained by, for example, carrying out emulsion polymerization with the use of an emulsifier such as alkyl benzene sulfonate. The elastomer having a nitrile structure may have a structural unit constituted by monomers that can be copolymerized with the $\alpha,\beta$-unsaturated nitrile and the conjugate diene. Examples of such monomers encompass: aromatic vinyl monomers such as styrene; $\alpha,\beta$-unsaturated carboxylic acids such as maleic acid and fumaric acid; and $\alpha,\beta$-unsaturated carboxylic esters such as diethyl maleate, monomethyl fumarate, and dibutyl itaconate. It is possible to use (i) each of these components independently or (ii) two or more of these components in combination.

The elastomer having an aromatic ring structure is a polymer or its hydride having a structural unit derived from aromatic vinyl and a structural unit derived from a conjugate diene. An amount of unit contained in the entire rubber, which unit has aromatic vinyl bonding, is, for example, 60 weight % or less and 5 weight % or more, and, from the perspective of physical properties of the composition, is preferably 50 weight % or less and 10 weight % or more, and more preferably 40 weight % or less and 15 weight % or more.

Examples of the aromatic vinyl encompass styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, N,N-dimethylamino methyl styrene, N,N-diethylamino methyl styrene, and vinylnaphthalene. Among these, the styrene is particularly preferable. It is possible to use (i) each of these components independently or (ii) two or more of these components in combination.

A large number of commercial products of such elastomers having a nitrile structure or an aromatic ring structure are known, and can be employed in the present invention.

(Mixing Method)

In mixing the latex and the carbon nanotube, a macromolecular material dispersed in a solvent is to be used.

The solvent, in which the macromolecular material is dispersed, only needs to be a dispersion liquid (latex) obtained by dispersing the macromolecular material in a solvent. A type of the solvent can be determined as appropriate. Especially, a dispersion liquid (latex) dispersed in water is preferable. Examples of a method for obtaining the latex encompass, but not particularly limited to: (I) a method (emulsion polymerization method) for obtaining a dispersion liquid, in which a macromolecular material is dispersed, by (i) adding, to water containing a surfactant, monomers constituting a macromolecular material and then (ii) polymerizing the monomers and (II) a method (forced emulsification method) for obtaining a dispersion liquid, in which a macromolecular material is dispersed, by (i) adding, to water containing a surfactant, a solution obtained by dissolving a macromolecular material in a solvent having a solubility parameter of 10 $(cal/cm^3)^{1/2}$ or less, followed by forcibly emulsifying the solution in water and then (ii) removing the solvent in which the macromolecular material is dissolved.

In a case where nitrile rubber is used as a macromolecular material, a solvent, in which to dissolve the nitrile rubber, is not limited to any particular one, provided that the nitrile rubber can be dissolved in the solvent. For example, the solvent can be an aliphatic hydrocarbon-based solvent, an aromatic hydrocarbon-based solvent, an ether-based solvent, an alcohol-based solvent, an ester-based solvent, a ketone-based solvent, or a mixed solvent of these, and is preferably a solvent that is highly compatible with a solvent in which a carbon nanotube is to be dispersed (such a solvent will be described later).

The solvent, in which nitrile rubber is dispersed, only needs to be a dispersion liquid (latex) obtained by dispersing the nitrile rubber in a solvent. A type of the solvent can be determined as appropriate. Especially, a nitrile rubber dispersion liquid (latex) dispersed in water is preferable.

Examples of a method for obtaining the nitrile rubber dispersion liquid encompass, but not particularly limited to: (I) a method (emulsion polymerization method) in which a nitrile rubber dispersion liquid is obtained by (i) adding, to water containing a surfactant, monomers constituting nitrile rubber and then (ii) polymerizing the monomers and (II) a method (forced emulsification method) in which a nitrile rubber dispersion liquid is obtained by (i) adding, to water containing a surfactant, a solution, in which nitrile rubber is dissolved, followed by forcibly emulsifying the solution and then (ii) removing the solvent in which the nitrile rubber is dissolved.

An amount of carbon nanotube for use in the production method of the present invention is, with respect to 100 parts by weight of the macromolecular material that constitutes latex, 0.01 part by weight or more and 10 parts by weight or less, for example, and is preferably 0.1 part by weight or more and 7 parts by weight or less, and more preferably 0.25 parts by weight or more and 5 parts by weight or less. Since the amount of carbon nanotube is 0.01 part by weight or more, excellent electrical conductivity can be secured. Since the amount of carbon nanotube is 10 parts by weight or less, fluidity of a composition increases, and therefore formability of the composition becomes excellent.

A method for mixing carbon nanotube slurry and latex so as to obtain a carbon nanotube dispersion liquid is not particularly limited, and only needs to be a stirring method that causes the carbon nanotube slurry and the latex are evenly mixed. It is preferable that an interval between the dispersing step and the mixing step is 48 hours or less. This is because, in such a case, deterioration in dispersibility of the carbon nanotube over time can be prevented. Furthermore, the mixing step is preferably carried out at a temperature of 15° C. or more and 40° C. or less, as is the case of the dispersing step described above. This is because, in such a case, a dispersing function of a dispersant, particularly of a surfactant, can be exerted well. In addition, it is more preferable that a process from the dispersing step to the mixing step is carried out at a temperature of 15° C. or more and 40° C. or less.

A specific method for carrying out the mixing step is not limited to any particular one, provided that the carbon nanotube slurry and the latex are mixed together. For example, it is only necessary to mix the carbon nanotube slurry and the latex by placing them in a single container and stirring them as appropriate. It is only necessary to use a well-known stirrer such as a stirring vane, a magnetic stirrer, or a planetary mill. A stirring time is preferably 10 minutes or more and 24 hours or less.

By using carbon nanotube slurry and latex, the following advantages can be obtained: (i) an aggregate of carbon nanotube is reduced and (ii) a composition to be obtained as a result has excellent electrical conductivity and is highly rupture resistant when pulled and is therefore strong against breakage.

[Coagulating Step]

It is more preferable that the production method of the present invention further includes a coagulating step in which a solid content in the mixture obtained in the mixing step is coagulated.

In the coagulating step, it is only necessary to obtain a composition by coagulating the carbon nanotube slurry (which can be said to be a carbon nanotube dispersion liquid) obtained in the mixing step. A method for the coagulating can be a method for coagulating latex, which method is known to a person skilled in the art. Examples of such a method encompass (i) a method in which the mixture obtained in the mixing step is added to a water-soluble organic solvent, (ii) a method in which an acid is added to the mixture, and (iii) a method in which salt is added to the mixture.

A preferable example of the water-soluble organic solvent is a solvent in which the macromolecular material in the latex is not dissolved whereas the dispersant is dissolved. Examples of such an organic solvent encompass methanol, ethanol, 2-propanol (also known as isopropyl alcohol), and ethylene glycol.

Examples of the acid encompass well-known materials to be used for coagulating common latex, such as acetic acid, formic acid, phosphoric acid, and hydrochloric acid.

Examples of the salt encompass well-known materials to be used for coagulating common latex, such as sodium chloride, aluminum sulfate, and potassium chloride.

Among the methods described above, a preferable one is a method in which (1) acidity/basicity of the mixture obtained in the mixing step is adjusted to pH 4 or more and pH 10 or less by, as needed, use of an acid or an alkaline additive and then (ii) an organic solvent is added. This is because, by such a method, a composition can be highly efficiently collected. The coagulating step is preferably carried out at a temperature of 15° C. or more and 40° C. or less as are the cases of the dispersing step and the mixing step. This is because, in such a case, a dispersing function of a dispersant, particularly of a surfactant, can be exerted well. That is, it is more preferable to carry out the dispersing step, the mixing step and the coagulating step at a temperature of 15° C. or more and 40° C. or less.

[Drying Step]

The production method of the present invention can include a drying step in which a coagulated substance obtained by the coagulating process in the coagulating step is dried.

In the drying step, any method can be used, provided that the method is a one in which the coagulated substance obtained by the coagulating process in the coagulating step is to be dried. For example of the method encompass a method for drying a polymer, which method is well-known to a person skilled in the art, such as warm-air drying or vacuum drying. Conditions under which to carry out the drying step may be determined, as appropriate, based on a water content and the like according to the use of a composition to be obtained by the drying step.

[Additive]

According to the production method of the present invention, it is possible to add, to a composition, various additives for improving or maintaining properties of a formed product. Examples of the additives encompass an antioxidant, a thermal stabilizer, a light stabilizer, an ultraviolet absorber, a pigment, a coloring agent, a foaming agent, an antistatic agent, a flame retardant, a lubricant, a softener, a tackifier, a plasticizer, a mold release agent, a deodorizer, and perfume.

In a case where an elastomer in particular is used as a macromolecular material to be contained in the carbon nanotube composition of the present invention, it is preferable to further include a cross-linker in order to secure formability and the mechanical strength of a formed product. The cross-linker is not limited to any particular one, provided that it is used as a cross-linker for the elastomer. Representative examples of the cross-linker are a sulfur cross-linker and an organic peroxide cross-linker which crosslink between unsaturated bonds of an elastomer. Of these, the sulfur cross-linker is preferable.

Examples of the sulfur cross-linker encompass: sulfurs such as powder sulfur, flowers of sulfur, precipitated sulfur, colloidal sulfur, surface treatment sulfur, and insoluble sulfur; sulfur-containing compounds such as sulfur chloride, sulfur dichloride, morpholine disulfide, alkylphenol disulfide, dibenzothiazyl disulfide, N,N'-dithiobis(hexahydro-2H-azepine-2), phosphorus-containing polysulfide, and macromolecule polysulfide; and sulfur-donating compounds such as tetramethylthiuramdisulfide, dimethyldithiocarbamic acid selenium, and 2-(4'-morpholino dithio)benzothiazole.

Examples of the organic peroxide cross-linker encompass dicumyl peroxide, cumene hydroperoxide, t-butyl cumyl peroxide, para-menthane hydroperoxide, di-t-butylperoxide, 1,3- and 1,4-bis(t-butylperoxyisopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexyne-3, 1,1-di-t-butylperoxy-3,5,5-trimethylcyclohexane, p-chlorobenzoyl peroxide, t-butylperoxyisopropyl carbonate, and t-butylperoxy benzoate.

There are no particular limitations on a cross-linker content of the carbon nanotube composition of the present invention. However, in a case where an elastomer is used as latex, the cross-linker content with respect to 100 parts by weight of the elastomer is preferably 0.1 to 10 parts by weight and more preferably 0.2 to 5 parts by weight. In a case where an organic peroxide cross-linker is used, polyfunctional monomers or the like can be used as a cross-linking auxiliary agent in combination with the organic peroxide cross-linker. Examples of the polyfunctional monomers encompass trimethylolpropane trimethacrylate, divinylbenzene, ethylene dimethacrylate, and triallyl isocyanurate. A cross-linking auxiliary agent content is not particularly limited, but is preferably in the range of 0.5 part by weight to 20 parts by weight with respect to 100 parts by weight of the elastomer.

In a case where the sulfur cross-linker is to be used, a cross-linking auxiliary agent and/or a cross-linking promoter can be used in combination with the sulfur cross-linker. Examples of the cross-linking auxiliary agent encompass zinc white and stearic acid. Examples of the cross-linking promoters encompass a guanidinium promoter, an aldehyde-amine promoter, an aldehyde-ammonia promoter, a thiazole promoter, a sulfenamide promoter, and a thiourea promoter. An amount of the cross-linking auxiliary agent and/or the cross-linking promoter is not particularly limited, and is preferably 0.1 part by weight or more and 10 parts by weight or less with respect to 100 parts by weight of the elastomer.

[Forming Method]

A method for forming a formed product with the use of the carbon nanotube composition of the present invention is not limited to any particular one, provided that the forming is carried out by use of a forming machine suitable for a desired shape of a formed product, example of which forming machine encompass an extruder, an injection machine, a compressor, and a roller. In a case where an elastomer composition is to be used, cross-linking is to be carried out, as needed, for stabilizing the shape of a formed product. The cross-linking can be carried out after carrying out the forming, or the cross-linking and the forming can be carried out simultaneously. A forming temperature is preferably 10° C. or more and 200° C. or less, and more preferably 25° C. or more and 120° C. or less. A cross-linking temperature is preferably 100° C. or more and 200° C. or less, more preferably 130° C. or more and 190° C. or less, and particularly preferably 140° C. or more and 180° C. or less. A cross-linking time is preferably 1 minute or more and 5 hours or less, and more preferably 2 minutes or more and 1 hour or less. In a case where a carbon nanotube composition containing an elastomer is to be used, secondary cross-linking can be carried out since, while a surface of the formed product is cross-linked, inside of the formed product may not be sufficiently cross-linked, depending on the shape and size of the formed product.

[Another Aspect of Carbon Nanotube Slurry]

The following description will discuss another example of carbon nanotube slurry and an elastomer composition to be obtained from the carbon nanotube slurry. Any matter that is not described herein is in accordance with the above description.

The carbon nanotube slurry can be obtained by dispersing a carbon nanotube in a solvent, which contains a dispersant, with the use of at least one selected from the group consisting of an ultrasonic wave homogenizer, a jet mill, and a high-shear stirring device, which carbon nanotube (i) has a G/D ratio of 1 or more and 20 or less and (ii) has a structural length of 100 µm or more and 5000 µm or less when synthesized.

The method for producing carbon nanotube slurry includes a dispersing step of dispersing a carbon nanotube in a solvent, which contains a dispersant, with the use of at least one selected from the group consisting of an ultrasonic wave homogenizer, a jet mill, and a high-shear stirring device, which carbon nanotube (i) has a G/D ratio of 1 or more and 20 or less and (ii) has a structural length of 100 µm or more and 5000 µm or less when synthesized. That is, the carbon nanotube slurry of the present aspect is obtained by carrying out the method of the present aspect for producing carbon nanotube slurry.

In the dispersing step, it is only necessary to disperse a carbon nanotube in a solvent, which contains a dispersant, with the use of at least one selected from the group consisting of an ultrasonic wave homogenizer, a jet mill, and a high-shear stirring device, which carbon nanotube (i) has a G/D ratio of 1 or more and 20 or less and (ii) has a structural length of 100 µm or more and 5000 µm or less when synthesized. Note that, by using a carbon nanotube having a G/D ratio of 1 or more and 20 or less and having (when synthesized) a structural length of 100 µm or more and 5000 µm or less, it is possible to obtain excellent electrical conductivity even if an amount of the carbon nanotube is small.

The elastomer composition of the present aspect is produced by a method including (i) a mixing step of mixing (a) the carbon nanotube slurry of the present aspect and (b) latex that is a dispersion liquid in which an elastomer is dispersed, (ii) a coagulating step of coagulating a solid content in a mixture obtained in the mixing step, and (iii) a drying step of drying a coagulated substance obtained in the solid content.

The method of the present aspect for producing an elastomer composition includes (i) a dispersing step of obtaining carbon nanotube slurry by dispersing, in water containing a dispersant, a carbon nanotube with the use of at least one selected from the group consisting of an ultrasonic wave homogenizer, a jet mill, and a high-shear stirring device, which carbon nanotube has a G/D ratio of 1 or more and 20 or less and has, when synthesized, a structural length of 100 µm or more and 5000 µm or less, (ii) a mixing step of mixing (a) the carbon nanotube slurry thus obtained and (b) latex that is a dispersion liquid in which an elastomer is dispersed, (iii) a coagulating step of coagulating a solid content in a mixture obtained in the mixing step, and (iv) a drying step of drying a coagulated substance obtained in the solid content. That is, the elastomer composition of the present aspect is obtained by carrying out the method of the present aspect for producing an elastomer composition.

Latex to be used for the elastomer composition of the present aspect and for the method of for producing the elastomer composition is an elastomer-dispersed liquid.

Examples of the latex encompass NBR latex (nitrile rubber latex), SBR latex (styrene butadiene rubber latex), H-NBR latex (hydrogenated nitrile rubber latex), natural rubber latex, IR latex (isoprene rubber latex), MBR latex (methacrylate ester/butadiene-based latex), CR latex (chloroprene rubber latex), VP latex (2-vinylpyridine latex), BR latex (butadiene rubber latex), ABS resin latex (acrylic nitrile-butadiene-styrene copolymer latex).

The latex only needs to be a dispersion liquid obtained by dispersing an elastomer in a solvent. A type of the solvent can be set as appropriate according to the use of a latex composition or the like. Especially, an aqueous dispersion, obtained by dispersing an elastomer in water, is more preferable.

There are no particular limitations on an amount of elastomer relative to an amount of a solvent in which to disperse the elastomer. The amount of elastomer only needs to be set as appropriate according to the use of carbon nanotube slurry to be produced or the like.

From the perspective of electrical conductivity and easy handling, the carbon nanotube to be contained in 100 parts by weight of the elastomer composition is, for example, 0.01 part by weight or more and 20 parts by weight or less.

In addition, a weight ratio of the elastomer in the elastomer composition to the carbon nanotube in the elastomer composition is more preferably 100:0.01 to 100:25 (elastomer:carbon nanotube).

The mixing step, the coagulating step, and the drying step are in accordance with the description above.

[Additional Remarks]

The method of the present invention for producing a carbon nanotube composition is preferably configured such that the dispersion treatment is at least one selected from the group consisting of a dispersion treatment by ultrasonic waves, a dispersion treatment by a jet mill, and a dispersion treatment by high-shear stirring.

The method of the present invention for producing a carbon nanotube composition is preferably configured such that the carbon nanotube has a BET specific surface area of 600 m$^2$/g or more.

The method of the present invention for producing a carbon nanotube composition is preferably configured such that the carbon nanotube has an average diameter (Av) and a diameter distribution (3σ) that satisfy 0.60>3σ/Av>0.50.

Preferably, the method of the present invention for producing a carbon nanotube composition further includes a coagulating step of coagulating a solid content in a mixture obtained in the mixing step.

The method of the present invention for producing a carbon nanotube composition is preferably configured such that the latex is a liquid in which an elastomer is dispersed.

The method of the present invention for producing a carbon nanotube composition is preferably configured such that the elastomer is nitrile rubber having a nitrile structure which constitutes 20 weight % or more of an entire weight of the nitrile rubber.

A carbon nanotube composition of the present invention is produced by the method of the present invention for producing a carbon nanotube composition.

The present invention also provides a rubber composition containing (A) nitrile rubber having a nitrile content of 20 weight % or more, and (B) a carbon nanotube having a BET specific surface area of 600 m$^2$/g or more. Preferably, the rubber composition further contains (C) a cross-linker. A method for producing the rubber composition includes a dispersing step of dispersing the carbon nanotube (B) in a solvent with the use of at least one selected from the group consisting of an ultrasonic wave homogenizer, a jet mill, and a high-shear stirring device. Note that the present invention also provides a formed product obtained from the rubber composition.

The present invention also provides carbon nanotube slurry obtained by dispersing, in a solvent containing a dispersant, a carbon nanotube with the use of at least one selected from the group consisting of an ultrasonic wave homogenizer, a jet mill, and a high-shear stirring device, which carbon nanotube has (i) a G/D ratio of 1 or more and 20 or less and (ii) a structural length of 100 μm or more and 5000 μm or less when synthesized.

The present invention also provides an elastomer composition that is produced by (i) a mixing step of mixing the carbon nanotube slurry with latex that is a liquid in which an elastomer is dispersed, (ii) a coagulating step of coagulating a solid content in a mixture obtained in the mixing step, and (iii) a drying step of drying a coagulated substance obtained in the coagulating step.

The method for producing the carbon nanotube slurry includes a dispersing step of dispersing, in a solvent containing a dispersant, a carbon nanotube with the use of at least one selected from the group consisting of an ultrasonic wave homogenizer, a jet mill, and a high-shear stirring device, which carbon nanotube has (i) a G/D ratio of 1 or more and 20 or less and (ii) a structural length of 100 μm or more and 5000 μm or less when synthesized. The dispersant is preferably a surfactant.

The present invention also provides a method for producing an elastomer composition, the method including (i) a dispersing step of obtaining carbon nanotube slurry by dispersing, in water containing a dispersant, a carbon nanotube with the use of at least one selected from the group consisting of an ultrasonic wave homogenizer, a jet mill, and a high-shear stirring device, which carbon nanotube has a G/D ratio of 1 or more and 20 or less and has, when synthesized, a structural length of 100 μm or more and 5000 μm or less, (ii) a mixing step of mixing (a) the carbon nanotube slurry thus obtained and (b) latex that is a dispersion liquid in which an elastomer is dispersed, (iii) a coagulating step of coagulating a solid content in a mixture obtained in the mixing step, and (iv) a drying step of drying a coagulated substance obtained in the solid content. The coagulating step is preferably a step in which acidity/basicity of the mixture is adjusted to the range of pH 4 to pH 10 and then an organic solvent is added. The dispersing step, the mixing step, and the coagulating step are more preferably carried out at a temperature of 20° C. or less.

EXAMPLES

Measurement of Electrical Conductivity

Electrical conductivity of a composition in each Example and each Comparative Example was measured with the use of a low resistivity meter (manufactured by Mitsubishi Chemical Analytech Co., Ltd., Product Name: "Loresta (Registered Trademark)-GP MCP-T610") by a method based on JIS K 7194. The details are as follows: First, four measurement samples were obtained by (i) subjecting 450 mg of a sample to vacuum press molding under a vacuum in such conditions as a temperature of 120° C., a pressure of 0.4 MPa, and a pressing time of 5 minutes, (ii) forming a molded sample into a thin circular form having a surface area of approximately 40 mmφ to 60 mmφ and having a thickness of 100 μm to 500 μm, and then (iii) extracting 4 specimens each having a square shape measuring 10 mm×10 mm. A PSP probe was selected as a four-needle probe of a low resistivity meter. The measurement samples were each fixed on an insulating board. Then, the probe was pressed against a center part (at a length of 5 mm and a width of 5 mm) of the measurement sample and a voltage of 10V was applied to measure the electrical conductivity. The electrical conductivity of each of the four measurement samples was measured, and an average value was set as the electrical conductivity of the sample.

Production Example 1

Synthesis of Carbon Nanotube

Carbon nanotubes, which were obtained by use of the super-growth method disclosed in Japanese Patent, No. 4,621,896, were used (such a carbon nanotube will be hereinafter abbreviated as "SGCNT").

Specifically, SGCNT-1 were grown under conditions as follows:
Carbon Compound: Ethylene; Rate of Feed: 50 sccm
Atmosphere (Gas) (Pa): Helium, Hydrogen Mixed Gas; Rate of
Feed: 1000 sccm
Pressure: 1 Atmospheric pressure
Moisture Vapor Addition Amount (ppm): 300 ppm
Reaction Temperature (° C.): 750° C.
Reaction Time (minute): 10 minutes
Metallic Catalyst (amount): Iron Thin Film; Thickness: 1 nm
Substrate: Silicon Wafer.

The SGCNT-1 thus obtained had a BET specific surface area of 1,050 m$^2$/g. The SGCNT-1 were subjected to measurement by use of a Raman spectrometer, and spectra of a radial bearing mode (RBM) were observed in a low-frequency region of 100 cm$^{-1}$ to 300 cm$^{-1}$, which is characteristic of a single-walled carbon nanotube. In addition, diameters of 100 randomly selected SGCNT-1 were measured by use of a transmission electron microscope. The results showed that (i) an average diameter (Av) was 3.3 nm, (ii) a diameter distribution (3σ) was 1.9, and (iii) (3σ/Av) was 0.58.

Production Example 2

Synthesis of Carbon Nanotube

SGCNT-2 were obtained by use of a method similar to that of Production Example 1 except that a thickness of an iron thin film of a metallic catalyst was set to 5 nm. The SGCNT-2 thus obtained had a BET specific surface area of 620 m$^2$/g. The SGCNT-2 were subjected to measurement by use of a Raman spectrometer, and spectra of a radial bearing mode (RBM) were observed in a low-frequency region of 100 cm$^{-1}$ to 300 cm$^{-1}$, which is characteristic of a single-walled carbon nanotube. In addition, diameters of 100 randomly selected SGCNT-2 were measured by use of a transmission electron microscope. The results showed that (i) an average diameter (Av) was 5.9 nm, (ii) a diameter distribution (3σ) was 3.3, and (iii) (3σ/Av) was 0.56.

Example 1

Into a metallic bottle, 125 g of ion-exchange water, 25 g of sodium dodecylbenzenesulfonate solution having a concentration of 10 weight %, 37 g of acrylic nitrile, 4 g of monofumarate n-butyl, and 0.5 g of t-dodecylmercaptan (molecular weight modifier) were introduced in this order. Then, gas inside the metallic bottle was substituted three times by nitrogen, and then 59 g of butadiene was introduced. Then, the metallic bottle was maintained at a temperature of 5° C. Then, 0.1 g of cumene hydroperoxide (polymerization initiator) was introduced, and then a polymerization reaction was made for 16 hours while the metallic bottle was rotated. Then, 0.1 g of hydroquinone solution (polymerization terminator) having a concentration of 10 weight % was added to terminate the polymerization reaction. Then, residual monomers were removed with the use of a rotatory evaporator having a water temperature of 60° C. This resulted in acrylic nitrile-butadiene-based latex (having a solid content concentration of approximately 40 weight %), which had nitrile structure by 34%.

30 mg of the SGCNT-1 was added to 300 mL of 1 weight % lauryl alcohol ethoxylate (manufactured by ADEKA Corporation, Product Name: "Adekatol (Registered Trademark) LA-1275") solution. Then, the mixture was irradiated with an ultrasonic wave for 20 minutes by use of a probe ultrasonic device (MITSUI ELECTRIC Co., Ltd., Product Name: "UX300") with an output of 300 W and a frequency of 20,000 kHz. This resulted in SGCNT-1 dispersion liquid containing no aggregate.

Then, 5.063 g of SGCNT-1 dispersion liquid and 0.5 g of the acrylic nitrile-butadiene-based latex were mixed together and stirred for 2 hours. This resulted in a mixed solution of SGCNT-1/rubber. Then, 2-propanol and a stirrer were introduced in a beaker, so that 2-propanol in a stirred state was prepared. Then, the mixed solution of SGCNT-1/rubber thus produced was gradually added to the beaker. This caused a crumb-like SGCNT-1/rubber composition to be coagulated in the 2-propanol.

Then, the SGCNT-1/rubber composition was extracted from the 2-propanol by suction filtration, and was vacuum dried at a temperature of 40° C. for 24 hours or more. This resulted in 0.197 g of a composition 1 having a ratio of SWCNT-1 (2.5 parts)/rubber (100 parts) (yield obtained by (weight of composition obtained)/((weight of rubber introduced)+(weight of carbon nanotube introduced))× 100=95%). A formed product obtained by forming the composition 1 into a thin disc was a flexible rubber-like substance, and its electrical conductivity was 0.8 S/cm.

Example 2

The 90 mg of SGCNT-2 was added to 90 mL of 1 weight % sodium dodecyl sulfate solution, and then was intermittently treated at temperatures of 30° C. to 60° C. at a linear velocity of 50 m/s with the use of a high-shear stirring device (manufactured by PRIMIX Corporation, Product Name: "FILMIX (Registered Trademark) 56-50 Type") until an aggregate of the SGCNT-2 disappeared. This resulted in a SGCNT-2 dispersion liquid 1 containing 0.1 weight % of SGCNT-2.

10 g of nitrile rubber (manufactured by ZEON Corporation, Product Name: "Zetpol (Registered Trademark) 3300") having 23.6% of nitrile structure was introduced into 90 g of methyl ethyl ketone, and was stirred at a temperature of 25° C. for 24 hours or more. This resulted in 100 g of 10% rubber solution. 15 g of 10% rubber solution was added to 75 ml of ion-exchange water, and the mixture was subjected to emulsification (i) at a linear velocity of 30 m/s, (ii) at temperatures of 30° C. to 60° C., (iii) for 20 minutes, and (iv) with the use of a high-shear stirring device (manufactured by PRIMIX Corporation, Product Name: "FILMIX (Registered Trademark) 56-50 Type). This resulted in a rubber-emulsified liquid. A solid content concentration in the rubber-emulsified liquid was measured from a residue and was 1.7 weight %.

15 g of the rubber-emulsified liquid thus produced and 6.375 g of SGCNT-2 dispersion liquid 1 were mixed together, and the mixture was stirred for 2 hours. This resulted in a mixed solution of SGCNT-2/rubber. 2-propanol and a stirrer were introduced into a beaker, so that 2-propanol in a stirred state was prepared. Then, the mixed solution of SGCNT-2/rubber thus produced was gradually added to the beaker. This caused a crumb-like SGCNT-2/rubber composition was coagulated in the 2-propanol.

Then, the SGCNT-2/rubber composition was extracted from the 2-propanol by suction filtration, and was vacuum dried at a temperature of 40° C. for 24 hours or more. This resulted in 0.248 g of composition 2 (yield: 95%) having a ratio of SWCNT-2 (2.5 parts)/rubber (100 parts). A formed product obtained by forming the composition 2 into a thin disc was a flexible rubber-like substance, and its electrical conductivity was 2.2 S/cm.

Example 3

90 mg of SGCNT-2 was added to 90 mL of 1 weight % sodium dodecyl sulfate solution, and the mixture was stirred 20 times with the use of a jet mill (manufactured by JOKOH CO., LTD., Product Name: "JN-20"). This resulted in an SGCNT-2 dispersion liquid 2 containing 0.1 weight % of SGCNT-2.

A method similar to that of Example 1 was carried out except the SGCNT-1 dispersion liquid of Example 1 was replaced by the SGCNT-2 dispersion liquid 2. This resulted in 0.199 g of a composition 3 (yield: 96%) having a ratio of SGCNT-2 (2.5 parts)/rubber (100 parts). A formed product obtained by forming the composition 3 into a thin disc was a flexible rubber-like substance, and its electrical conductivity was 2.3 S/cm.

Example 4

A method similar to that of Example 1 was carried out except that (i) a dispersant was switched from lauryl alcohol ethoxylate to sodium alkylbenzene sulfonate (manufactured by Kao Chemicals, Product Name: "PELEX (Registered Trademark) SS-L") and (ii) a carbon nanotube to be used was switched from SGCNT-1 to multi-walled carbon nanotube (MWCNT; manufactured by Nanocyl Corporation, Product Name: "NC7000", BET specific surface area of 290 m$^2$/g). This resulted in an MWCNT dispersion liquid 1 containing no aggregate. Diameters of 100 randomly selected NC7000 were measured with the use of a transmission electron microscope. The results showed that (i) an average diameter (Av) was 9.3 nm, (ii) a diameter distribution (3σ) was 2.6, and (iii) (3σ/Av) was 0.28.

A method similar to that of Example 1 was carried out except that the SGCNT-1 dispersion liquid of Example 1 was replaced by the MWCNT dispersion liquid 1. This resulted in 0.191 g of a composition 4 (yield: 92%) having a ratio of NC7000 (2.5 parts)/rubber (100 parts). A formed product obtained by forming the composition 4 into a thin disc was a flexible rubber-like substance, and its electrical conductivity was 1×10$^{-3}$ S/cm.

Example 5

A method similar to that of Example 1 was carried out except that (i) a dispersant was switched from lauryl alcohol ethoxylate to a sulfosuccinate-based anionic surfactant (manufactured by Lion Corporation, Product Name: "LIPAL (Registered Trademark) 870P") and (ii) a carbon nanotube to be used was switched from SGCNT-1 to multi-walled carbon nanotube (MWCNT; manufactured by Nanostructured & Amorphous Materials Inc., Lot. 1234, BET specific surface area of 58 $m^2/g$). This resulted in an MWCNT dispersion liquid 2 containing no aggregate. Diameters of 100 randomly selected Lot. 1234 were measured with the use of a transmission electron microscope. The results showed that (i) an average diameter (Av) was 76.8 nm, (ii) a diameter distribution (3σ) was 19.4, and (iii) (3σ/Av) was 0.25.

A method similar to that of Example 1 was carried out except that (i) the SGCNT-1 dispersion liquid of Example 1 was replaced by the MWCNT dispersion liquid 2 and (ii) NBR latex was replaced by SBR latex (manufactured by ZEON Corporation, Product Name: "Nipol (Registered Trademark) LX112"). This resulted in 0.108 g of a composition 5 (yield: 52%) having a ratio of Lot. 1234 (2.5 parts)/rubber (100 parts). A formed product obtained by forming the composition 5 into a thin disc was a flexible rubber-like substance, and its electrical conductivity was $4.2 \times 10^{-5}$ S/cm.

Example 6

A method similar to that of Example 1 was carried out except that (i) a dispersant was switched from lauryl alcohol ethoxylate to sodium dodecylbenzenesulfonate and (ii) a carbon nanotube to be used was switched from SGCNT-1 to multi-walled carbon nanotube (MWCNT; manufactured by Nanocyl, Product Name: "NC7000", BET specific surface area of 290 $m^2/g$). This resulted in an MWCNT dispersion liquid 3 containing no aggregate.

A method similar to that of Example 1 was carried out except that the SGCNT-1 dispersion liquid of Example 1 was replaced by the MWCNT dispersion liquid 3. This resulted in 0.181 g of a composition 6 (yield: 87%) having a ratio of NC7000 (2.5 parts)/rubber (100 parts). A formed product obtained by forming the composition 6 into a thin disc was a flexible rubber-like substance, and its electrical conductivity was $8 \times 10^{-4}$ S/cm.

Comparative Example 1

A method similar to that of Example 1 was carried out except that (i) a dispersant was switched from lauryl alcohol ethoxylate to sodium dodecyl sulfate and (ii) a carbon nanotube to be used was switched from SGCNT-1 to HiPCO (manufactured by NanoIntegris Inc., BET specific surface area 700 $m^2/g$). This resulted in a Comparative Example SWCNT dispersion liquid 1 containing no aggregate. Diameters of 100 randomly selected HiPCO were measured with the use of a transmission electron microscope. The results showed that (i) an average diameter (Av) was 1.1 nm, (ii) a diameter distribution (3σ) was 0.2, and (iii) (3σ/Av) was 0.18.

A method similar to that of Example 1 was carried out except that the SGCNT-1 dispersion liquid of Example 1 was replaced by the Comparative Example SWCNT dispersion liquid. This resulted in 0.176 g of a Comparative Example composition 1 (yield: 85%) having a ratio of HiPCO (2.5 parts)/rubber (100 parts). A formed product obtained by forming the comparative Example composition 1 into a thin disc was a flexible rubber-like substance, and its electrical conductivity was not more than a measurable minimum value.

Comparative Example 2

A method similar to that of Example 1 was carried out except that (i) a dispersant was switched from lauryl alcohol ethoxylate to sodium dodecyl sulfate and (ii) a carbon nanotube to be used was switched from SGCNT-1 to multi-walled carbon nanotube (MWCNT; manufactured by Nanostructured & Amorphous Materials Inc., Lot. 1232, BET specific surface area of 57 $m^2/g$). This resulted in a Comparative Example MWCNT dispersion liquid containing no aggregate. Diameters of 100 randomly selected Lot. 1232 were measured with the use of a transmission electron microscope. The results showed that (i) an average diameter (Av) was 51.1 nm, (ii) a diameter distribution (3σ) was 9.8, and (iii) (3σ/Av) was 0.19.

A method similar to that of Example 1 was carried out except that the SGCNT-1 dispersion liquid of Example 1 was replaced by the Comparative Example MWCNT dispersion liquid. This resulted in 0.058 g of Comparative Example composition 2 (yield: 28%) having a ratio of Lot. 1232 (2.5 parts)/rubber (100 parts). A formed product obtained by forming the comparative Example composition 2 into a thin disc was a flexible rubber-like substance, and its electrical conductivity was such a significantly low value as $1.4 \times 10^{-6}$ S/cm.

Comparative Example 3

30 mg of SGCNT-1 was added to 300 mL of 1 weight % lauryl alcohol ethoxylate (manufactured by ADEKA Corporation, Product Name: "Adekatol (Registered Trademark) LA-1275") solution, and the dispersion liquid obtained was divided into small portions. Then, a dispersion treatment was carried out several times for 30 minutes by use of a ball mill device (manufactured by Fritsch Co. Ltd., Germany, Product Name: "P-7") at 500 revolutions per minute. This resulted in a Comparative Example SGCNT-1 dispersion liquid.

A method similar to that of Example 1 was carried out except that the SGCNT-1 dispersion liquid of Example 1 was replaced by the Comparative Example SGCNT-1 dispersion liquid. This resulted in 0.182 g of a Comparative Example composition 3 (yield: 88%) having a ratio of SGCNT-1 (2.5 parts)/rubber (100 parts). A formed product obtained by forming the comparative Example composition 3 into a thin disc was a flexible rubber-like substance, and its electrical conductivity was not more than a measurable minimum value.

Table 1 shows the above results and the like.

TABLE 1

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Composition | Resin | NBR | HNBR | NBR | NBR | SBR | NBR | NBR | NBR | NBR |
|  | Carbon Nanotube | SGCNT-1 | SGCNT-2 | SGCNT-2 | NC7000 | Lot. 1234 | NC7000 | HiPCO | Lot. 1232 | SGCNT-1 |

TABLE 1-continued

| | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| CNT Characteristics | Average Diameter (Av) | 3.3 | 5.9 | 5.9 | 9.3 | 76.8 | 9.3 | 1.1 | 51.1 | 3.3 |
| | Diameter Distribution (3σ) | 1.9 | 3.3 | 3.3 | 2.6 | 19.4 | 2.6 | 0.2 | 9.8 | 1.9 |
| | 3σ/Av | 0.58 | 0.56 | 0.56 | 0.28 | 0.25 | 0.28 | 0.18 | 0.19 | 0.58 |
| Production Process | CNT Dispersion Treatment | Ultrasonic Wave | High-Shear Stirring Device | Jet Mill | Ultrasonic Wave | Ultrasonic Wave | Ultrasonic Wave | Ultrasonic Wave | Ultrasonic Wave | Ball Mill |
| | Dispersant | LA1275 | SDS | SDS | PELEX SS-L | LIPAL 870P | SDBS | SDS | SDS | SDS |
| Evaluation | Yield | 95% | 95% | 96% | 92% | 52% | 87% | 85% | 28% | 88% |
| | Volume Conductivity | 0.8 S/cm | 2.2 S/cm | 2.3 S/cm | $1 \times 10^{-3}$ S/cm | $4.2 \times 10^{-5}$ S/cm | $8 \times 10^{-4}$ S/cm | N.D. | $1.4 \times 10^{-6}$ S/cm | N.D. |

INDUSTRIAL APPLICABILITY

The present invention (i) can be used in any industrial field in which rubber or the like is utilized and (ii) is particularly suitable for rubber products such as tires, hoses, packing, and the like.

The invention claimed is:

1. A method for producing a carbon nanotube composition, comprising:
    a dispersing step of dispersing a carbon nanotube in a solvent to obtain a carbon nanotube slurry by carrying out a dispersion treatment that brings about a cavitation effect, the carbon nanotube having an average diameter (Av) and a diameter distribution (3σ) that satisfy 0.60>3σ/Av>0.50; and
    a mixing step of mixing the carbon nanotube slurry with latex;
    wherein:
    the solvent comprises a dispersant;
    an amount of the carbon nanotube dispersed in the solvent is 0.01 part by weight or more and 1 part by weight or less based on 100 parts by weight of a whole amount of the solvent containing the dispersant; and
    the composition exhibits a volume conductivity of at least 0.8 S/cm.

2. The method as set forth in claim 1, wherein the dispersion treatment is at least one selected from the group consisting of a dispersion treatment by ultrasonic waves, a dispersion treatment by a jet mill, and a dispersion treatment by high-shear stirring.

3. The method as set forth in claim 1, wherein the carbon nanotube has a BET specific surface area of 600 m²/g or more.

4. The method as set forth in claim 1, further comprising:
    a coagulating step of coagulating a solid content in a mixture obtained in the mixing step.

5. The method as set forth in claim 1, wherein the latex is a liquid in which an elastomer is dispersed.

6. The method as set forth in claim 5, wherein the elastomer is nitrile rubber having a nitrile structure which constitutes 20 weight % or more and 55 weight or less of an entire weight of the nitrile rubber.

7. The method as set forth in claim 1, wherein the carbon nanotube has a structural length of 100 μm or more and 5,000 μm or less.

8. The method as set forth in claim 1, wherein the carbon nanotube has a G/D ratio of 1 or more and 20 or less.

9. The method as set forth in claim 1, wherein the carbon nanotube has a weight density of 0.002 g/cm³ to 0.2 g/cm³.

10. A carbon nanotube composition which is produced by the method as set forth in claim 1.

* * * * *

UNITED STATES PATENT AND TRADEMARK OFFICE
CERTIFICATE OF CORRECTION

PATENT NO. : 9,748,016 B2  
APPLICATION NO. : 14/360746  
DATED : August 29, 2017  
INVENTOR(S) : Masahiro Shigeta et al.

Page 1 of 1

It is certified that error appears in the above-identified patent and that said Letters Patent is hereby corrected as shown below:

On the Title Page

Please change Item (22) from "PCT Filed: Oct. 26, 2012" to --PCT Filed: Nov. 26, 2012--.

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*